Feb. 13, 1940. S. C. PACE 2,190,123
LIGHTING SIGNAL
Filed July 2, 1938      3 Sheets-Sheet 1

Inventor
Stephen C. Pace

Feb. 13, 1940. S. C. PACE 2,190,123
LIGHTING SIGNAL
Filed July 2, 1938 3 Sheets-Sheet 2
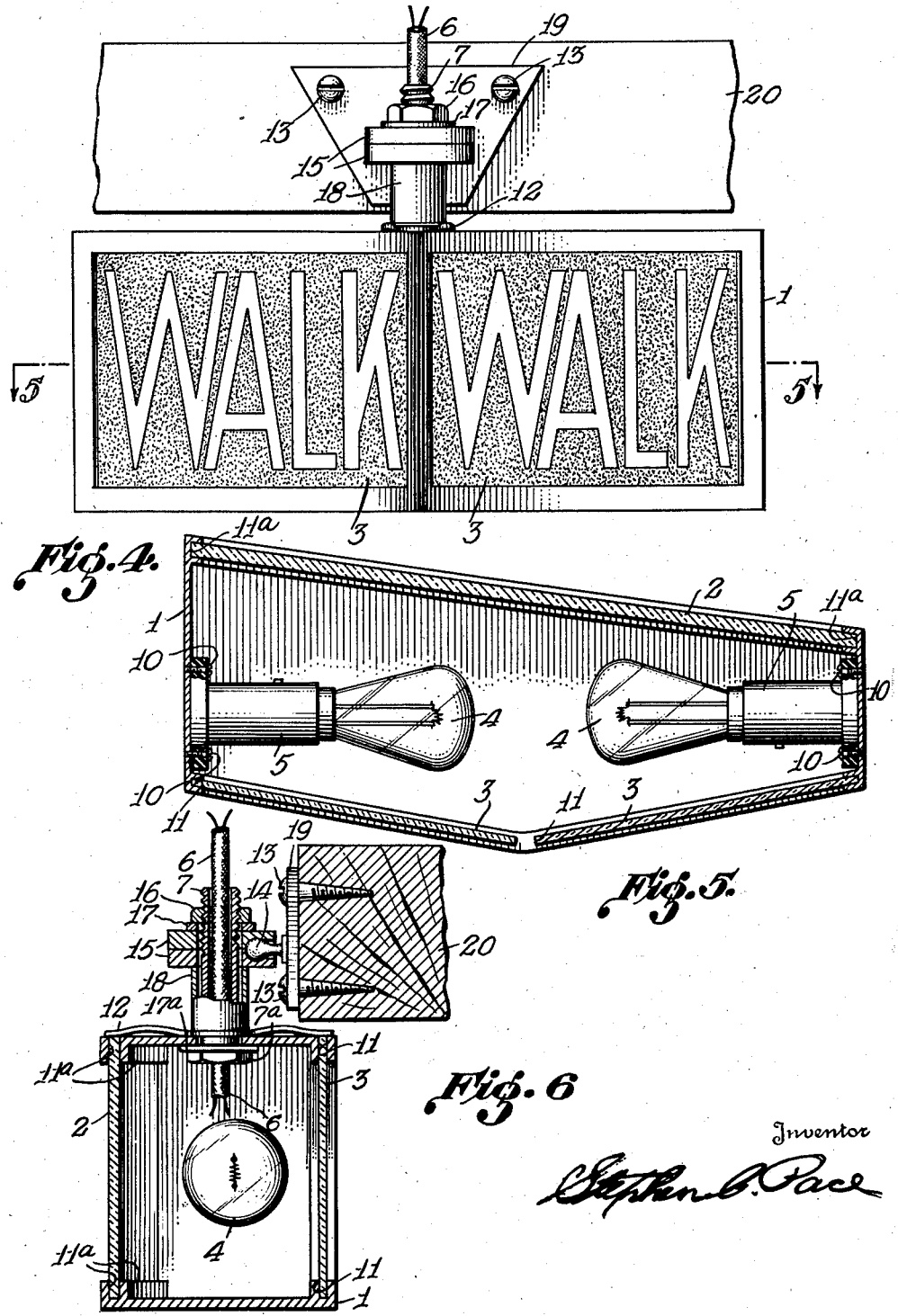

Feb. 13, 1940. S. C. PACE 2,190,123
LIGHTING SIGNAL
Filed July 2, 1938   3 Sheets-Sheet 3
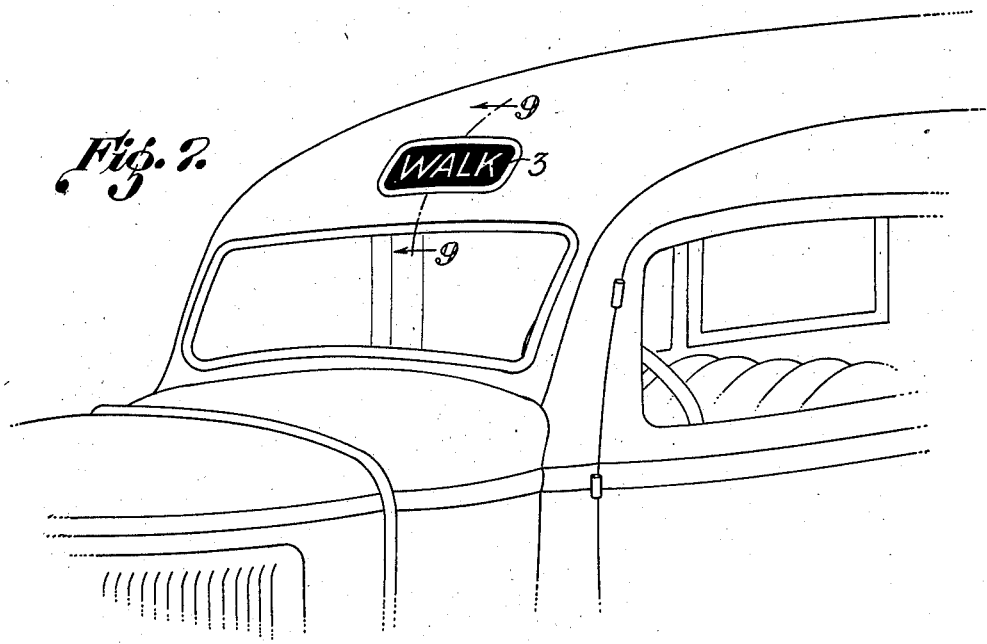
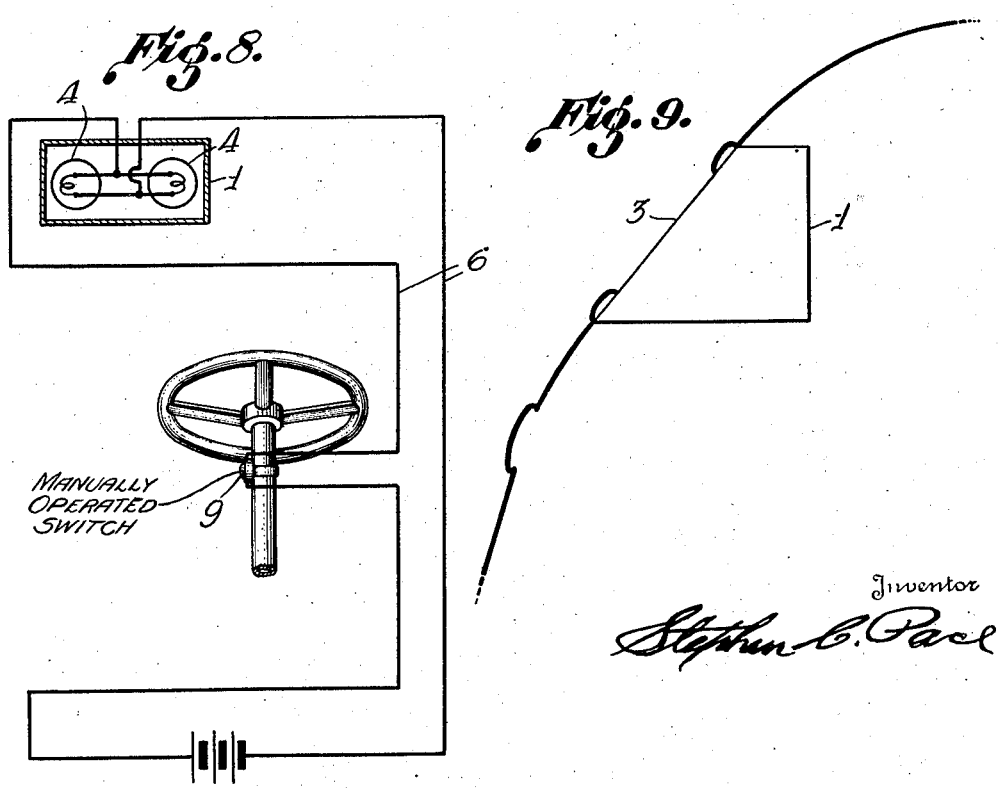

Patented Feb. 13, 1940

2,190,123

UNITED STATES PATENT OFFICE 2,190,123

LIGHTING SIGNAL

Stephen C. Pace, Washington, D. C.

Application July 2, 1938, Serial No. 217,279

3 Claims. (Cl. 177—329)

The invention relates to a lighting signal to be placed on automobiles, buses, street cars and other vehicles for the protection of life, limb and property, also to expedite pedestrian and vehicular traffic.

The objects of the invention are,

1. To provide a lighting signal which will enable the operator of the above described vehicles to signal to the pedestrian, that he, the pedestrian, is being accorded the right of way and may "walk" in safety.

2. My lighting signal enables, and to a marked degree its installation will suggest to the operator of a vehicle that he concede to the pedestrian the pedestrian's legal rights.

3. It will make for safety, as against accidents; for security, as against insecurity; for a definite understanding, as against uncertainty and hesitation on the part of pedestrian and operator alike.

One form of the invention is illustrated in the accompanying drawings, in which Figure 1 is a fragmentary front elevational view of an automobile illustrating my invention as it appears to a pedestrian, except, that the word "Walk" or such other word or words as may be substituted therefor, is not visible to the pedestrian until the operator of the vehicle snaps or depresses the switch 9, thus lighting the bulbs 4, thereby plainly indicating to the pedestrian that he may "walk" in safety. The box I is fitted with a rear vision mirror 2 and may therefore be substituted for the existing mirror and attached at the same point inside the vehicle, parallel to and approximately one inch from the wind-shield.

Figure 2 is a rear sectional view with rear vision mirror 2 removed, illustrating my invention attached to panel 20 immediately above the wind-shield.

Figure 3 is a top view of my invention partly in section, taken on the line 3—3 of Figure 2, and it also shows spring clamp 12 which holds front glass 3 and rear vision mirror 2 in place after they are inserted from the top into grooves 11 and 11a respectively. This Figure 3 departs slightly from a rectangle because of the necessity for setting the rear vision mirror 2 at an angle to obtain an unobstructed view of the rear, while front glass 3 should be parallel with the wind-shield in this type of box.

Figure 4 is a front view of my invention illustrating the use of two separate front glasses 3 set at an angle to make them more conspicuous to the pedestrian.

Figure 5 is a top sectional view of Figure 4 taken on the line 5—5 of Figure 4.

Figure 3:
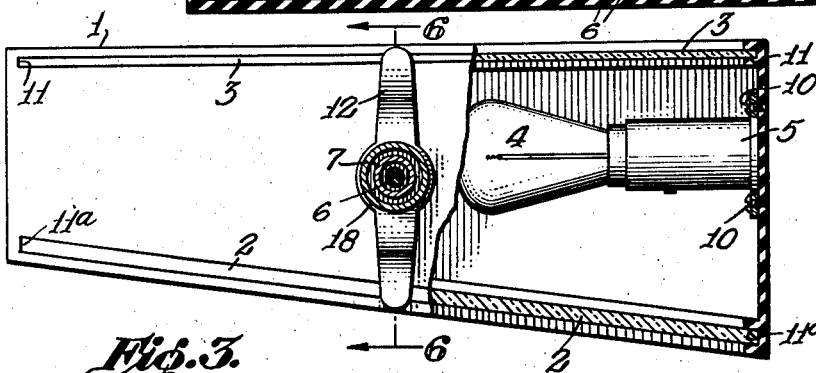

Figure 6 is an end sectional view taken on line 6—6 of Figure 3 and shows the method of attaching plate 19 to panel 20 above the wind-shield; screws 13 and plate 19 are fastened to panel 20, and ball 14 is fastened to plate 19, while said ball 14 is fitted to socket 15 which is fastened to ⅜ inch hollow bolt 7, and held in position by nut 16 with washers 17 and 17a and spacer 18, with wires 6 passing through hollow threaded bolt 7 to sockets 5.

Figure 2:
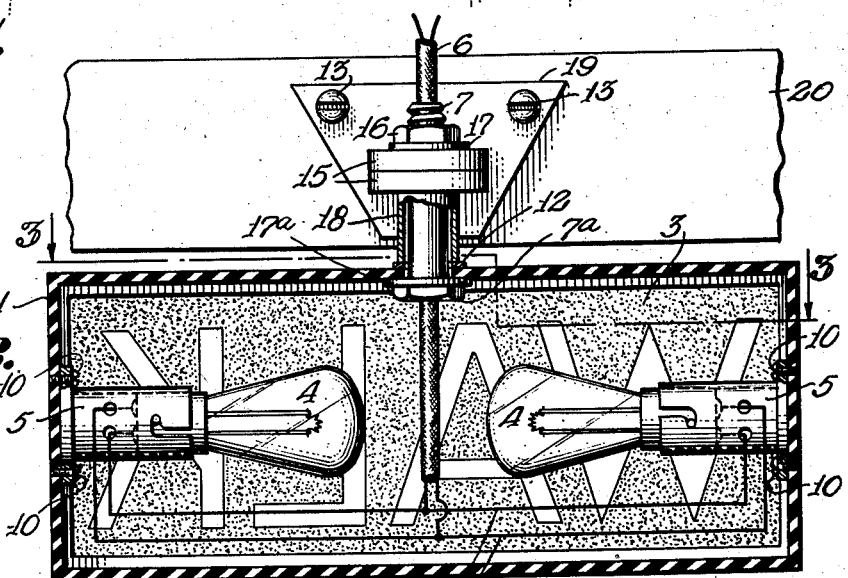

Figure 7 is a fragmentary perspective of an automobile illustrating another position in which my invention may be placed, either outside the automobile or built in flush, and may have one glass front as in Figure 2, or two glass fronts 3 set at angles as in Figure 5.

Figure 8 is a diagrammatic view illustrating the wiring diagram of my invention, in which the switch 9 is shown on the steering housing; it may be installed at any convenient location.

Figure 9 is a fragmentary diagrammatic view taken on the line 9—9 of Figure 7.

Figure 1:
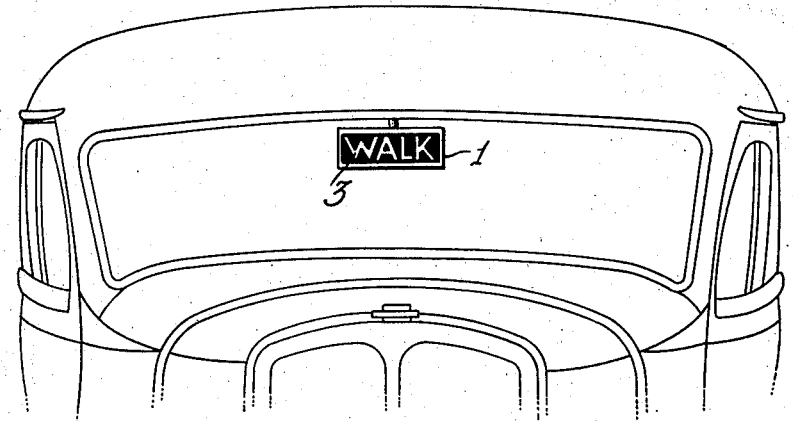

The lighting signal embodies a box I made of aluminum or other metal, Bakelite, wood or other material. Figure 1 shows the preferred location of the lighting signal, because of the fact that a pedestrian looks to the eyes of the operator of a motor vehicle to determine his course, and the suggested location is practically in line with the vision of both operator and pedestrian. Figure 2 with rear vision mirror 2 removed, shows the shell or box I, the glass front 3 which may be green glass painted black except for the word "Walk" or other word or words of similar import which show conspicuously to the pedestrian when switch 9 is pressed closing the circuit; bulbs 4, sockets 5, multiple wiring 6, ⅜ inch hollow threaded bolt 7, having a head 7a bolted to and passing through box I to admit wires 6, one of which is grounded, and the other run to switch 9, thence to any convenient wire that will complete the circuit. There are two bolts 10 which fasten sockets 5 to the ends of box I.

Figure 3 shows rear vision mirror 2 and front glass 3 inserted in slots 11a and 11 respectively with spring clamp 12 holding them firmly in position.

Figure 4 is substantially the same as Figure 2 and varies only in two particulars; Figure 4 has two separate front glasses 3, while Figure 2 provides for only one front glass 3, and the front of Figure 4 is constructed at a slight angle to the plane of the back.

Figure 5 is substantially the same as Figure 3 and varies only in that it shows two separate front glasses 3, while Figure 3 shows only one front glass 3, and the front of Figure 5 is constructed at a slight angle to the plane of the back.

Rear vision mirror 2 may have a mirror surface front and back, the latter to act as a reflector behind bulbs 4.

Front glass 3 is preferably to be green and painted black or other suitable color, except for the word "Walk", "Go" or other word or words of similar import which are to show green when bulbs 4 are lighted.

All bulbs 4 are to be of voltage suited to the type of vehicle on which they are used.

Wherever the word automobile appears in this specification, it means also street car, bus or other vehicle used for transportation.

I claim:

1. In combination, an automobile of the enclosed type, a lamp box including cut out portion defining means indicating pedestrian right of way and electric lighting means in the box for illuminating the cut out means substantially uniformly, and means for supporting said signal immediately in the rear and substantially in the center of the wind-shield.

2. The combination as defined in claim 1 in which the back wall of the box is provided with a rear view mirror.

3. A signal box having a wall showing the word "Walk" through a stencil, electric lighting means in the box, the latter containing a rear vision mirror so as to make a compact unit, attached to which is a conventional ball and socket joint, the whole being readily attached to any make of automobile by merely removing the standard rear vision mirror and substituting the signal box.

STEPHEN C. PACE.